June 22, 1954  W. E. SAXE  2,681,763
INTEGRATING SYSTEM FOR CONVEYER SCALES
Filed Nov. 20, 1950  2 Sheets-Sheet 1

INVENTOR:
WALTER E. SAXE
BY HIS ATTORNEYS
HARRIS, KIECH, FOSTER & HARRIS
By Ward D. Foster June 22, 1954   W. E. SAXE   2,681,763
INTEGRATING SYSTEM FOR CONVEYER SCALES
Filed Nov. 20, 1950   2 Sheets-Sheet 2
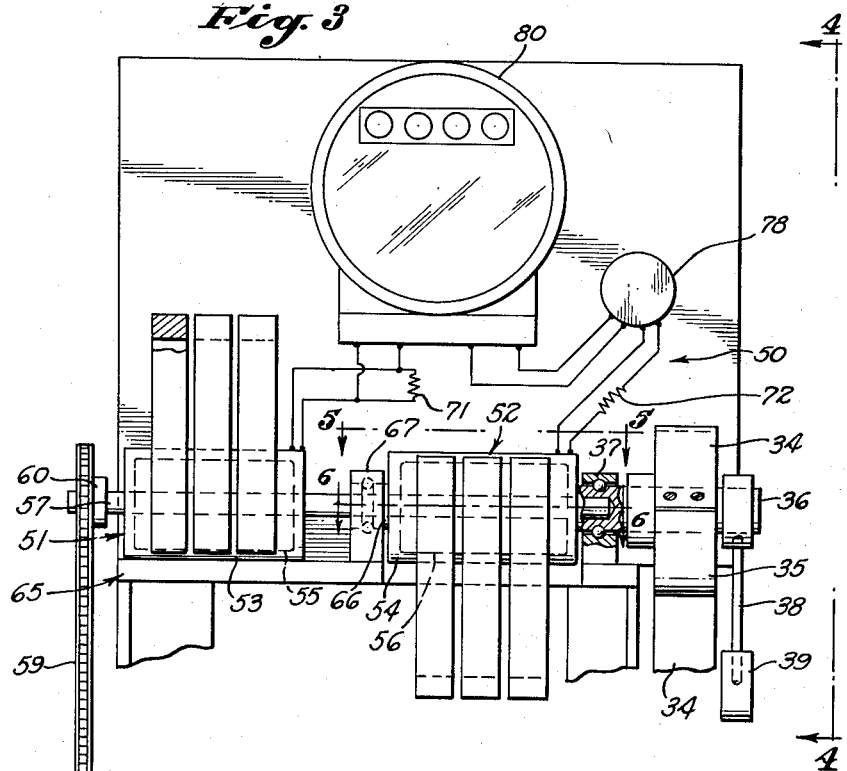
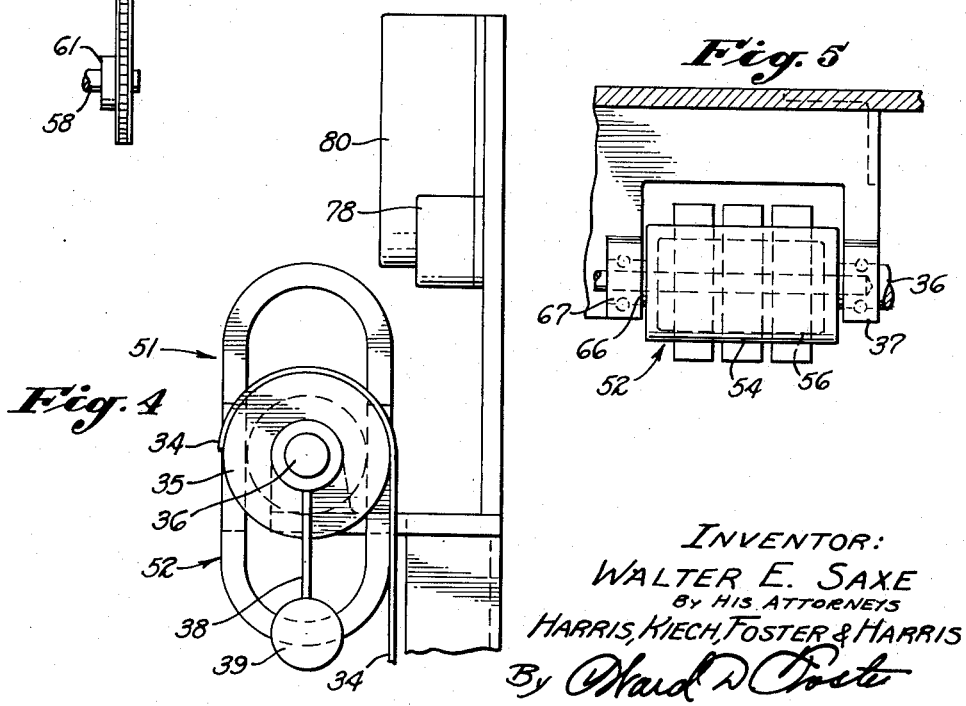
INVENTOR:
WALTER E. SAXE
BY HIS ATTORNEYS
HARRIS, KIECH, FOSTER & HARRIS Patented June 22, 1954

2,681,763

UNITED STATES PATENT OFFICE 2,681,763

INTEGRATING SYSTEM FOR CONVEYER SCALES

Walter E. Saxe, Pasadena, Calif., assignor to The Conveyor Company, Inc., Los Angeles, Calif., a corporation of California Application November 20, 1950, Serial No. 196,540

7 Claims. (Cl. 235—61)

The present invention relates to an apparatus for measuring variables and, more particularly, to an apparatus for integrating variables with respect to time.

Since the invention finds particular utility in the conveyor art for integrating the weight of material carried by a conveyor with respect to time to obtain the total weight of material transported by the conveyor in a given period of time, it will be considered in such connection herewith as a matter of convenience, although it will be understood that the invention is susceptible of other applications. For example, the invention may be employed to integrate the rate of flow of a fluid through a conduit with respect to time to obtain the total flow of such fluid in a given period of time. Also, other applications of the invention are possible.

A primary object of the invention is to provide a measuring apparatus which includes means actuable by the variable to be measured for varying the power factor of an alternating current circuit means as a function of variations in the variable.

If the instantaneous value of the variable is desired, a power factor indicator may be employed in connection with the circuit means, which is an important object of the invention.

Also, a wattmeter may be employed to indicate the product of current, voltage and power factor as a function of time, which is another important object of the invention.

However, if, as indicated above, the integral of the variable with respect to time is desired so as to determine, for example, the total weight of material transported by a conveyor in a given period of time, or, as another example, the total flow of fluid in a given interval, I contemplate employing a watthour meter to integrate the product of current, voltage and power factor with respect to time, which is still another important object of the invention.

It will be understood that while a power factor indicator has been referred to above, such an indicator may be calibrated in any desired units. For example, such an indicator may be operated in units of weight, such as pounds or tons. Further, the wattmeter hereinbefore referred to may be calibrated in any desired units, depending upon the nature of the variable being measured, and the terms "wattmeter" and "wattmeter means" as used herein merely designate an instrument which is, in principle, a wattmeter, but which may be calibrated in any desired units. Similarly, the term "watthour meter" designates any instrument which operates in the same manner as a watthour meter, but which may be calibrated in any desired units.

A particularly important object of the invention is to provide an apparatus which includes scale means responsive to the weight of material on a given length of a conveyor for varying the power factor of an alternating current circuit means, and which includes means driven by the conveyor for varying either the current or voltage in such circuit means in proportion to variations in the speed of the conveyor, and to provide in connection with such a circuit means a watthour meter for continuously integrating the product of the current, voltage and power factor. With this construction, the total weight of material transported by the conveyor with respect to any reference point in time may be obtained directly, irrespective of variations in the speed of the conveyor, by employing a watthour meter calibrated in units of weight, which is an important feature of the invention.

Another object of the invention is to provide such an apparatus which includes two alternating current generators, preferably single phase generators of identical construction so that the armatures thereof may be rotated at the same speed to obtain current and voltage outputs from the two generators which are of the same frequency. Preferably, the armatures of the two generators are mounted on a common shaft.

Another object is to mount the field structure of one of the generators for rotation relative to the other about the axis of the common shaft through an angle of at least 90° so as to vary the phase angle between the current output of one of the generators and the voltage output of the other.

An important object is to provide means for rotating the rotatably mounted field structure as a function of variations in the variable to be measured so that the phase angle between the current output of one generator and the voltage output of the other also varies as a function of variations in the variable. Since the cosine of such phase angle may be regarded as the power factor of the circuit means comprising the two generators, the instantaneous value of the variable may be measured by means of a power factor indicator connected to the outputs of the two generators, or the value of the variable as a function of time may be measured by a wattmeter connected to the generators, or the integral of the variable with respect to time may be obtained by connecting a watthour meter to the generators.

Specifically, it is an object of the invention to provide a scale means responsive to the weight of material on a given length of a conveyor for rotating the rotatably mounted field structure as a function of variations in the weight of material on such given length of conveyor so as to vary the phase angle between the current output of one generator and the voltage output of the other, whereby to vary the power factor of the circuit means, and to provide a watthour meter having its current terminals connected in series with the current output of one generator and having its voltage terminals connected across the voltage output of the other generator. With this construction, by employing a watthour meter calibrated in terms of weight, the watthour meter registers the integral of the product of the current output of one generator, the voltage output of the other generator, and the power factor, in terms of the total weight of material transported by the conveyor during any desired interval of time, which is an important feature of the invention.

Another object is to provide such an apparatus wherein the armatures of the two generators are driven by the conveyor. As a result, the current and voltage outputs of the two generators vary as a function of variations in the speed of the conveyor and, by providing regulating means for maintaining the current output of one generator, or the voltage output of the other generator, constant, the indication provided by the watthour meter is independent of variations in the speed of the conveyor, which is an important feature.

Another object is to provide regulating means for maintaining substantially constant the current output applied to the watthour meter.

An important advantage of the invention is that the indicating means, whether it be a power factor indicator, a wattmeter, or a watthour meter, may be located remotely from the conveyor. Alternatively, the watthour meter, for example, may be located adjacent the conveyor and a remote indication may be provided by means of a photoelectric system, for example, responsive to the number of revolutions of the rotor of the watthour meter.

Another important advantage of the present invention is that it provides simple indicating and integrating means devoid of complex mechanical elements.

The foregoing objects and advantages of the present invention, together with various other objects and advantages which will become apparent, may be attained through the utilization of the exemplary embodiments of the invention which are illustrated in the accompanying drawings and which are described in detail hereinafter. Referring to the drawings:

Fig. 3 is a side view of the apparatus of the invention;

Fig. 4 is an end view thereof taken as indicated by the arrows 4—4 of Fig. 3, Fig. 4 duplicating a portion of Fig. 1 on an enlarged scale;

Fig. 5 is a fragmentary view taken as indicated by the arrows 5—5 of Fig. 3 of the drawings.

Figure 1:
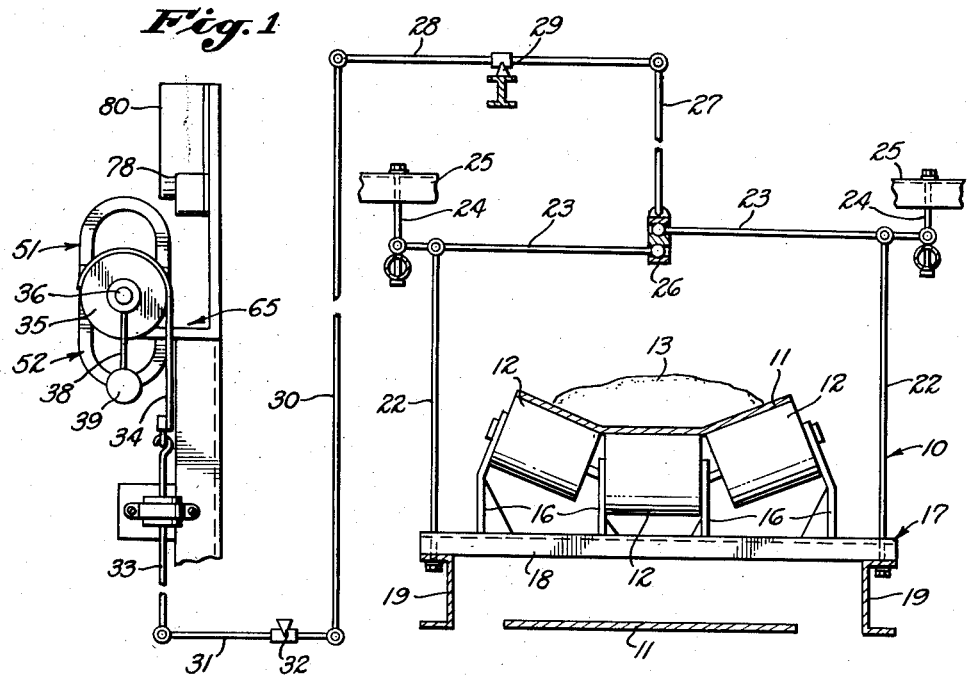
Fig. 1 is a view illustrating semidiagrammatically the connections between a conveyor and a scale means.

Referring particularly to Fig. 1 of the drawings, the apparatus of the invention is illustrated in connection with a conveyor means 10 which includes an endless conveyor 11, the latter being a belt in the particular construction illustrated. The conveyor 11 is carried by troughing rollers 12 which maintain the upper run of the conveyor 11 in the form of a trough to insure retention of the material 13 carried thereby. The rollers 12 are carried by brackets 16 which are mounted on a frame 17 comprising transverse and longitudinal rails 18 and 19.

The length of the frame 17 longitudinally of the conveyor 11 is preferably less than the length of the conveyor, although not necessarily so, the frame 17 and the length of conveyor carried thereby being suspended from hanger rods 22 which are pivotally connected at their upper ends to lateral bars 23. The latter are pivotally connected at their outer ends to hanger rods 24 which are carried by a transverse rail 25 stationarily supported in any suitable manner, not shown. As will be apparent, with this construction, the frame 17 and the length of the conveyor 11 carried thereby are suspended from the transverse rail 25 in such a manner that the frame and the length of conveyor carried thereby may move vertically in response to variations in the weight of the material 13 carried by the conveyor.

The lateral bars 23 are pivotally connected at their inner ends to a fitting 26 which is connected to the lower end of a link 27, the latter being pivotally connected at its upper end to one end of a lever 28 having its fulcrum at 29. The other end of the lever 28 is pivotally connected by means of a link 30 to one end of a lever 31 having its fulcrum at 32. Pivotally connected to the other end of the lever 31 is a link 33 which is connected at its upper end to a draft band 34. The latter partially encircles and is connected to a drum 35 which is connected to and carried by a shaft 36 mounted in a bearing 37, Fig. 3. The shaft 36 also has fixed thereon an arm 38 which carries a weight 39 at its outer end.

The dimensions of the various elements hereinbefore described, such as the moment arms of the lateral bars 23 and the levers 28 and 31, the radius of the drum 35, the length of the weight arm 38 and the weight 39, are so proportioned that the weight arm 38 is vertical when the length of the conveyor carried by the suspended frame 17 is empty and is horizontal when the length of conveyor on the frame 17 carries a maximum load of the material 13. Thus, the angular position of the weight arm 38 relative to the vertical is a function of the weight of material 13 on the length of conveyor carried by the suspended frame 17. More accurately expressed, the moment of the weight 39, i. e., the product of the weight 39 and the horizontal component of the length of the weight arm 38, is proportional to the weight of the material 13 on the length of conveyor carried by the suspended frame 17, the moment of the weight 39 being proportional to the product of the length of the weight arm and the sine of the angle the weight arm makes with the vertical. Thus, when the weight on the length of conveyor carried by the suspended frame 17 is zero, the angle that the weight arm 38 makes with the vertical is zero so that the moment of the weight 39 is zero, the scale system being in balance under such conditions so that a slight load on the conveyor will cause the weight arm to move slightly. Conversely, when the weight on the length of conveyor carried by the suspended frame 17 is a maximum, the weight arm 38 makes an angle of 90° with the vertical and the moment of the weight 39 is equal to the product of the weight 39 and the length of the weight arm 38 since the sine of 90° is equal to one.

Referring now to Fig. 3 of the drawings in particular, the apparatus of the invention is provided with an alternating current circuit means 50 which includes alternating current generators 51 and 52 respectively provided with field structures 53 and 54 and armatures 55 and 56, the field structures being the stators of the generators in the particular construction illustrated and the armatures being the rotors thereof. The generators 51 and 52 are single-phase generators and are preferably of identical construction so as to generate currents and voltages of the same frequency when the armatures 55 and 56 thereof are rotated at the same speed. To facilitate rotating the armatures 55 and 56 at the same speed, they are carried by a common shaft 57 which is coaxial with and one end of which is journaled in the shaft 36 which carries the weight 39. The other end of the armature shaft 57 is adapted to be driven by a shaft 58 which is connected to the conveyor means 10 in any suitable manner, not shown, to be driven thereby at a speed proportional to the speed of the conveyor 11, a driving connection between the shaft 58 and the armature shaft 57 being provided by a chain 59 trained over a sprocket 60 on the armature shaft and a sprocket 61 on the shaft 58. Thus, the currents and voltages generated by the two generators 51 and 52 always tend to be proportional to the speed of the conveyor 11, which is an important feature for reasons to be discussed hereinafter.

Figure 6:
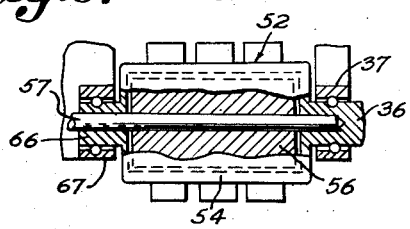
Fig. 6 is a fragmentary sectional view taken along the line 6—6 of Fig. 3.

The field structure 53 of the generator 51 is stationary, being suitably secured to a supporting structure 65 in a manner not shown. The field structure 54 of the other generator 52 is mounted for rotation about the axis of the weight and armature shafts 36 and 57 and is secured to the weight shaft 36 so that its position always corresponds to that of the weight 39. Referring to Figs. 3 and 6, this is accomplished by securing the field structure 54 to the inner end of the weight shaft 36, as by welding or otherwise securing the housing of the field structure 54 to the inner end of the weight shaft. Projecting from the end of the field structure 54 opposite the weight shaft 36 and suitably secured thereto, as by welding, is a stub shaft 66 which is journaled in a bearing 67 carried by the supporting structure 65, the bearing 37 also being carried by the supporting structure 65. The armature shaft 57 extends through and is journaled in the stub shaft 66, in addition to being journaled in the weight shaft 36. Additional bearings, not shown, for the armature shaft may be provided in the generator 51.

The field structures 53 and 54 of the generators 51 and 52 are illustrated as being provided with horseshoe magnets. However, any desired type of generator may be employed.

The field structures 53 and 54 are so arranged that when the weight arm 38 is vertical, which corresponds to no load on the length of conveyor carried by the suspended frame 17, the current and voltage generated by one of the generators 51 and 52 are 90° out of phase with respect to the current and voltage generated by the other, and when the weight arm 38 is horizontal, which corresponds to a maximum load on the length of a conveyor carried by the suspended frame 17, the current and voltage generated by one of the generators is in phase with the current and voltage generated by the other. In other words, the phase angle between the current and voltage of one generator and the voltage and current of the other is the complement of the angle which the weight arm 38 makes with the vertical. Preferably, the current and voltage outputs of each of the generators 51 and 52 are in phase with respect to each other, this being accomplished by connecting the generators 51 and 52 in series with purely resistive loads 71 and 72, respectively. However, it is not necessary that the current and voltage of each generator be in phase so long as the phase angle between the current output of one generator and the voltage output of the other generator is the complement of the angle of the weight arm 38 from the vertical. Actually, it is necessary to utilize only the current output from one of the generators and the voltage output from the other in accordance with the present invention. In the particular construction illustrated, the voltage output of the generator 51 and the current output of the generator 52 are utilized, the generator 51 hereinafter being referred to as the voltage generator and the generator 52 hereinafter being referred to as the current generator as a matter of convenience.

The cosine of the phase angle between the voltage output of the voltage generator 51 and the current output of the current generator 52 is regarded as the power factor of the circuit means 50. As will be apparent, when the phase angle between the current output of the current generator 52 and the voltage output of the voltage generator 51 is 90°, the power factor is zero, and when the phase angle is 0°, the power factor is one. Thus, since the angle of the weight arm 38 from the vertical is always the complement of the phase angle because of the interconnection between the weight arm and the rotatable field structure 54, the power factor of the circuit means 50 is zero when the angle of the weight arm from the vertical is zero and is one when the angle of the weight arm is 90°.

In other words, since the phase angle between the voltage output of the voltage generator 51 and the current output of the current generator 52 is always the complement of the angle of the weight arm 38 from the vertical, the cosine of the phase angle, i. e., the power factor of the circuit means 50, is always equal to the sine of the angle of the weight arm 38 from the vertical. Since the moment of the weight 39 is always proportional to the sine of the angle of the weight arm 38 from the vertical, and since the power factor is always equal to the sine of the angle of the weight arm from the vertical, it follows that the moment of the weight 39 is always proportional to the power factor. However, as hereinbefore explained, the moment of the weight 39 is always proportional to the weight of material on the length of conveyor carried by the suspended frame 17. Consequently, the weight of material on the length of conveyor carried by the suspended frame 17 is always proportional to the power factor of the circuit means 50, the power factor being zero when the load on such length of conveyor is zero and being one when the load thereon is a maximum. This relationship is an extremely important feature of the present invention, as will become apparent.

The significance of the foregoing relation between the load on the length of conveyor carried by the suspended frame 17 and the power factor of the circuit means 50 will now be considered in detail. If it is desired to obtain an indication of the load on the suspended length of conveyor at any instant, this may be accomplished readily by connecting the voltage terminals of a power factor indicator across the voltage generator 51 and by connecting the current terminals of the power factor indicator in series with the current generator 52. The power factor reading provided by the power factor indicator is then representative of the instantaneous weight of material on the suspended length of conveyor. Preferably, such a power factor indicator would be calibrated in units of weight, rather than in terms of the power factor of the circuit means 50.

Figure 2:
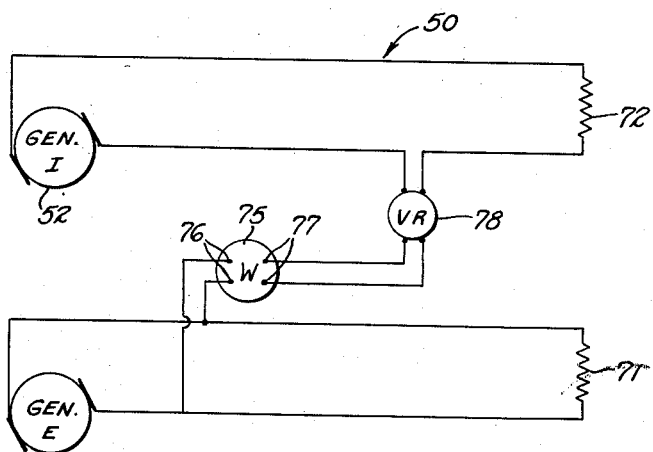
Fig. 2 is a diagrammatic view of the circuit means of the apparatus of the present invention.

While a power factor indicator may be connected to the generators 51 and 52 as suggested above to obtain the instantaneous value of the load on the suspended length of conveyor, the present invention may also be utilized to obtain the instantaneous rate at which material is being transported by the conveyor 11 and the total weight of material transported thereby in a given interval of time. Considering the former first with particular reference to Fig. 2 of the drawings, the numeral 75 designates a wattmeter having its voltage terminals 76 connected across the output of the voltage generator 51 and having its current terminals 77 connected in series with the output of the current generator 52 through a voltage regulator 78 which serves to maintain the current output of the current generator 52 substantially constant irrespective of variations in the speed of the conveyor 11, which, as hereinbefore indicated, drives the armatures 55 and 56 of the generators 51 and 52. However, the voltage output of the voltage generator 51 is permitted to vary with variations in the speed of the conveyor 11, the voltage output of the voltage generator being at all times proportional to the speed of the conveyor. Thus, the wattmeter 75 continuously registers the product of the constant current output of the current generator 52, the variable voltage output of the voltage generator 51, and the variable power factor. Since, as herein before indicated, the power factor is proportional to the load on the suspended length of conveyor, and the voltage output of the voltage generator 51 is proportional to the speed of the conveyor, the reading provided by the wattmeter 75 at any instant is proportional to the instantaneous value of the rate at which the material 13 is being transported by the conveyor 11 in terms of weight per unit time. If desired, the wattmeter 75 may be calibrated so that the rate at which the material is being transported by the conveyor may be read directly in such units.

The following numerical example, which is not intended as limiting, may provide a clearer understanding of the foregoing. Assume that the maximum load on the conveyor 11 is fifty pounds per foot, and that the maximum speed of the conveyor is four hundred feet per minute. Thus, the conveyor 11 has a maximum capacity of six hundred tons per hour. Assume further that the voltage output of the voltage generator 51 is one hundred volts under such conditions and that the current output of the current generator 52 is six amperes. Under the foregoing conditions, i. e., with the conveyor 11 fully loaded and operating at a speed of four hundred feet per minute, the power factor of the circuit means 50 is equal to one since the voltage output of the generator 51 and the current output of the generator 52 are in phase when the load on the conveyor is a maximum. Consequently, the wattmeter 75 will indicate the product of one hundred volts, six amperes, and a power factor of one, or six hundred watts. Thus, the reading of six hundred watts on the wattmeter 75 corresponds to the rate of six hundred tons per hour at which the conveyor is transporting the material 13. Now, if the load on the conveyor is reduced to one-half of capacity, the power factor is reduced to 0.5 and the wattage indication provided by the wattmeter 75 is reduced to three hundred watts, which corresponds to a rate of transport of three hundred tons per hour by the conveyor. Similarly, if the load on the conveyor is reduced to zero, the power factor becomes zero so that the wattmeter reading goes to zero.

Now, if we assume that the conveyor is loaded to capacity, i. e., fifty pounds per foot, and the speed of the conveyor is reduced ten percent, then the voltage output of the voltage generator 51 drops to ninety while the current output of the current generator 52 remains constant at six amperes because of the action of the voltage regulator 78. Under such conditions, the wattage indicated by the wattmeter 75 will be equal to the product of ninety volts, six amperes and a power factor of one, or five hundred forty watts. This corresponds to a transport rate of five hundred forty tons per hour by the conveyor 11, or ninety percent of the maximum rate of six hundred tons per hour.

The foregoing numerical values were selected primarily to cause the reading of the wattmeter 75 in watts to coincide with the rate which the conveyor 11 transports the material 13 in tons per hour. However, the scale on the wattmeter 75 may be calibrated to fit any desired set of numerical values so as to provide readings directly in tons per hour, or other suitable units of weight per unit time. In actual practice, the current output of the current generator 52 preferably would not be as high as six amperes and preferably would be in the neighborhood of 0.1 ampere. However, none of the numerical values hereinbefore expressed is intended to be limiting.

In order to obtain the total weight of the material 13 transported by the conveyor 11 in a given interval of time, it is merely necessary to substitute a watthour meter 80 for the wattmeter 75, as illustrated in Fig. 4 of the drawings. The watthour meter 80 integrates the product of the voltage output of the generator 51, the current output of the generator 52, and the power factor of the circuit means 50, with respect to time so that the reading provided thereby is proportional to the total weight of material transported by the conveyor, starting at a time reference of zero. For example, if it is desired to determine the weight of material transported by the conveyor 11 during an eight-hour period, it is merely necessary to subtract the reading of the watthour meter 80 at the beginning of such period from the reading thereof at the end of such period and convert the difference into the desired units of weight, such as tons. Preferably, the watthour meter 80 is calibrated to read directly in units of weight so that such conversion is not necessary.

As previously described in connection with the wattmeter 75, the readings of the wattmeter 80 are compensated for variations in the weight of material on the conveyor 11 because of the effect of such variations on the power factor, and are compensated for variations in the speed of the conveyor because of the effect of such variations on the voltage output of the generator 51 applied to the watthour meter.

It will be understood that instead of maintaining the current output of the current generator 52 constant and permitting the voltage output of the voltage generator 51 to vary in proportion to variations in conveyor speed, the voltage output of the generator 51 may be maintained constant and the current output of the generator 52 permitted to vary. However, as a practical matter, it is preferable to maintain the current output of the generator 52 constant and permit the voltage output of the generator 51 to vary.

It will be noted that a small force is required to cut lines of force in the field of the generator 52 as the field structure thereof is rotated. However, this is taken care of by suitably balancing the scale system.

It will be apparent that the invention provides an extremely compact and simple apparatus which may be utilized to provide either indications of the instantaneous weight of material on the suspended length of the conveyor, the instantaneous value of the rate at which material is being transported by the conveyor, or the total weight of material transported by the conveyor over a given period of time, or it may be employed to indicate all three. The indicator, or indicators, may be positioned adjacent the generators 51 and 52, or they may be remotely located at a control station, for example. As will be apparent, the invention is well adapted to remote location of the indicator, or indicators, since the distance from the generators may be varied readily by varying the lengths of the leads thereto. If desired, the watthour meter 80 may be positioned adjacent the generators 51 and 52 and a remote indication may be provided by a suitable transmitting means, such as a photoelectric system, not shown, responsive to rotation of the rotor of the watthour meter.

It will be understood that the apparatus of the invention may be employed for other purposes than that hereinbefore described. For example, the apparatus may be employed to measure the rate of and/or total flow of fluid through a conduit, for example, by rotating the field structure 54 of the generator 52 in response to variations in the dynamic pressure of the fluid in the conduit. Other applications of the invention will appear to those skilled in the art.

In view of the foregoing, I do not intend to be limited to the particular embodiments and applications of the invention hereinbefore disclosed, and hereby reserve the right to all such applications of the invention and all changes, modifications and substitutions of the embodiments disclosed as come within the spirit of the invention.

I claim as my invention:

1. In a measuring apparatus, the combination of: alternating current circuit means including two alternating current generators each having a rotatable armature and a field structure, one of said field structures being rotatable relative to the other so as to vary the phase angle between the voltage output of one of said generators and the current output of the other; means for rotating said armatures at such speeds that the frequencies of said voltage and current outputs are equal; means actuable by a variable to be measured for rotating said one field structure relative to the other to vary said phase angle as a function of variations in the variable; wattmeter means connected to said generators for measuring the product of said voltage output, said current output, and the cosine of said phase angle; means for varying the speeds of said armatures as a function of variations in another variable so as to vary one of said outputs as a function of variations in said other variable; and means for maintaining the other of said outputs constant.

2. In a measuring apparatus, the combination of: alternating current circuit means including two alternating current generators each having a rotatable armature and a field structure, said armatures being mounted on a common shaft and one of said field structures being rotatable relative to the other so as to vary the phase angle between the voltage output of one of said generators and the current output of the other; means actuable by a variable to be measured for rotating said one field structure to vary said phase angle as a function of variations in said variable; means for rotating said shaft at a speed which varies as a function of variations in another variable so as to vary said voltage and current outputs as a function of variations in said other variable; regulating means for maintaining one of said outputs constant; and wattmeter means connected to said generators for measuring the product of the voltage output, said current output, and the cosine of said phase angle.

3. A measuring apparatus according to claim 2 wherein said regulating means maintains said current output constant.

4. In a measuring apparatus, the combination of: two alternating current generators each having a rotatable armature and a field structure; a shaft common to and carrying said armatures; means for mounting one of said field structures for rotation relative to the other about the axis of said common shaft so as to vary the phase angle between the voltage output of one of said generators and the current output of the other; means actuable by a variable to be measured for rotating said one field structure relative to the other so as to vary said phase angle as a function of variations in said variable; wattmeter means having voltage terminals connected across the output of said one generator and having current terminals connected in series with the output of said other generator for measuring the product of said voltage output, said current output, and the cosine of said phase angle; and means for driving said common shaft, said driving means including means for varying the speed of said shaft as a function of variations in another variable so as to vary said product as a function of variations in said other variable.

5. An apparatus as defined in claim 4 wherein said wattmeter means comprises a watthour meter for integrating said product with respect to time.

6. In an apparatus for measuring the weight of material carried by a conveyor in a given period of time, the combination of: two alternating current generators each having a rotatable armature and a field structure; a shaft common to and carrying said armatures; means for mounting one of said field structures for rotation relative to the other about the axis of said common shaft to provide for varying the phase angle between the voltage output of one of said generators and the current output of the other; rotatable scale means connected to said conveyor and responsive to variations in the weight of material on a given length of said conveyor, said scale means being connected to said one field structure so as to rotate same with variations in the weight of material on said length of conveyor, whereby to vary said phase angle as a function of variations in the weight of material on said length of said conveyor; means connected to and driven by said conveyor for driving said common shaft, whereby any variations in the speed of said conveyor tends to vary said voltage and current outputs; regulating means for maintaining one of said outputs constant; and a watthour meter having its voltage terminals connected across said voltage output and having its current terminals connected in series with said current output so as to integrate the product of said voltage output, said current output, and the cosine of said phase angle with respect to time, said watthour meter being calibrated in units of weight.

7. An apparatus according to claim 6 wherein said regulating means comprises means for maintaining said current output constant.

References Cited in the file of this patent

UNITED STATES PATENTS

| Number | Name | Date |
|---|---|---|
| 2,070,178 | Pottenger, Jr. et al. | Feb. 9, 1937 |
| 2,080,186 | Reymond | May 11, 1937 |
| 2,112,683 | Wooley | Mar. 29, 1938 |
| 2,185,767 | Jefferies | Jan. 2, 1940 |
| 2,228,068 | White | Jan. 7, 1941 |
| 2,403,152 | Roters | July 2, 1946 |
| 2,406,836 | Holden | Sept. 3, 1946 |
| 2,454,520 | Moore, Jr. | Nov. 23, 1948 |
| 2,488,760 | Brown | Nov. 22, 1949 |